(12) United States Patent
Champion et al.

(10) Patent No.: US 11,125,958 B2
(45) Date of Patent: Sep. 21, 2021

(54) OPTICAL PLUGGABLE MODULE FOR A COMMUNICATION SYSTEM

(71) Applicant: TE CONNECTIVITY CORPORATION, Berwyn, PA (US)

(72) Inventors: Bruce Allen Champion, Camp Hill, PA (US); Christopher William Blackburn, Bothell, WA (US); Michael David Herring, Apex, NC (US); Eric David Briant, Dillsburg, PA (US)

(73) Assignee: TE CONNECTIVITY SERVICES GmbH, Schaffhausen (CH)

( * ) Notice: Subject to any disclaimer, the term of this patent is extended or adjusted under 35 U.S.C. 154(b) by 0 days.

(21) Appl. No.: 16/895,613

(22) Filed: Jun. 8, 2020

(65) Prior Publication Data

US 2020/0301084 A1  Sep. 24, 2020

Related U.S. Application Data

(63) Continuation-in-part of application No. 16/274,740, filed on Feb. 13, 2019, now Pat. No. 10,680,388.

(60) Provisional application No. 62/644,096, filed on Mar. 16, 2018.

(51) Int. Cl.
| | |
|---|---|
| *G02B 6/42* | (2006.01) |
| *H01R 12/71* | (2011.01) |
| *H01R 12/79* | (2011.01) |
| *H01R 12/70* | (2011.01) |
| *H01R 13/6582* | (2011.01) |
| *H01R 13/66* | (2006.01) |

(52) U.S. Cl.
CPC .......... *G02B 6/4284* (2013.01); *G02B 6/428* (2013.01); *G02B 6/4249* (2013.01); *G02B 6/4278* (2013.01); *H01R 12/7005* (2013.01); *H01R 12/714* (2013.01); *H01R 12/79* (2013.01); *H01R 13/6582* (2013.01); *H01R 13/6658* (2013.01)

(58) Field of Classification Search
None
See application file for complete search history.

(56) References Cited

U.S. PATENT DOCUMENTS

| | | | |
|---|---|---|---|
| 4,948,379 A | 8/1990 | Evans | |
| 8,021,057 B2 * | 9/2011 | Tamura | G02B 6/4244 385/75 |
| 9,011,177 B2 | 4/2015 | Lloyd et al. | |
| 9,523,827 B2 * | 12/2016 | Sano | G02B 6/4256 |
| 9,869,832 B2 * | 1/2018 | Jokura | G02B 6/4236 |
| 2006/0079102 A1 | 4/2006 | DeLessert | |

(Continued)

*Primary Examiner* — Oscar C Jimenez (57) ABSTRACT

A communication system includes a host circuit board and an interposer assembly coupled to the host circuit board having an interposer substrate including an host circuit board contacts at a lower surface and module contacts at an upper surface. The communication system includes an optical pluggable module having a mating interface along a bottom of the optical pluggable module facing the interposer assembly. The optical pluggable module includes a module substrate and optical engines coupled to the module substrate with optical fiber cables extending from the optical engines to the cable end. The module substrate has module substrate contacts at a lower surface of the module substrate being electrically connected to corresponding module contacts of the interposer assembly at the upper surface of the interposer substrate.

20 Claims, 8 Drawing Sheets

(56) References Cited

U.S. PATENT DOCUMENTS

| | | |
|---|---|---|
| 2008/0248661 A1 | 10/2008 | Costello |
| 2012/0003879 A1 | 1/2012 | Mason et al. |
| 2013/0237092 A1 | 9/2013 | Rubens |
| 2014/0041937 A1 | 2/2014 | Lloyd et al. |
| 2016/0197423 A1 | 7/2016 | Reginer |
| 2016/0233598 A1 | 8/2016 | Wittig |
| 2018/0034175 A1 | 2/2018 | Lloyd et al. |
| 2018/0287280 A1 | 10/2018 | Ratkovic et al. |

\* cited by examiner

OPTICAL PLUGGABLE MODULE FOR A COMMUNICATION SYSTEM

CROSS REFERENCE TO RELATED APPLICATIONS

This application is a continuation-in-part application of U.S. patent application Ser. No. 16/274,740 filed Feb. 13, 2019, titled "PLUGGABLE MODULE FOR A COMMUNICATION SYSTEM", which claims benefit to U.S. Provisional Application No. 62/644,096 filed Mar. 16, 2018, the subject matter of each of which is herein incorporated by reference in its entirety.

BACKGROUND OF THE INVENTION

The subject matter herein relates generally to communication systems having pluggable modules.

At least some known communication systems include receptacle assemblies, such as input/output (I/O) connector assemblies, that are configured to receive a pluggable module and establish a communicative connection between the pluggable module and a host circuit board. As one example, a known receptacle assembly includes a cage member member that is mounted to a circuit board and configured to receive a pluggable transceiver in an elongated cavity of the cage member. The receptacle assembly includes an electrical communication connector including contacts terminated to the host circuit board, such as by soldering or a press-fit connection. The contacts of the electrical communication connector having mating ends in a card slot for mating with the pluggable module. The pluggable module has a circuit card therein that is received in the card slot to make the electrical connection with the electrical communication connector. The cables of the pluggable module are terminated to the circuit card, such as by soldering the conductors of the cables to the circuit card.

Conventional communication systems are not without disadvantages. For instance, the communication systems have multiple interfaces between the conductors of the cables and the host circuit board. For instance, there are interfaces defined between the conductors and the circuit card of the pluggable module, between the circuit card and the contacts of the electrical communication connector of the receptacle assembly, and between the contacts of the electrical communication connector and the host circuit board. The electrical communication connector of the receptacle assembly mounted to the host circuit board adds cost to the system and causes issues and electrical performance in regard to reflections, noise, and attenuation, particularly at high data rates. Similarly, the circuit card in the pluggable module adds cost to the system and causes issues and electrical performance in regard to reflections, noise, and attenuation, particularly at high data rates.

Accordingly, there is a need for a communication system having a robust and efficient signal path between the pluggable module and the host circuit board.

BRIEF DESCRIPTION OF THE INVENTION

In one embodiment, a communication system is provided including a host circuit board having a mounting area extending between a front and a rear and having contact pads within the mounting area. An interposer assembly is coupled to the host circuit board at the mounting area. The interposer assembly has an interposer substrate including an upper surface and a lower surface. The interposer assembly has host circuit board contacts at the lower surface electrically connected to corresponding contact pads of the host circuit board and module contacts at the upper surface. The communication system includes an optical pluggable module extending longitudinally between a mating end and a cable end. The optical pluggable module includes a mating interface along a bottom of the optical pluggable module facing the interposer assembly. The optical pluggable module includes a module substrate and optical engines coupled to the module substrate. The optical pluggable module has optical fiber cables extending from the optical engines to the cable end. The module substrate has module substrate contacts at a lower surface of the module substrate being electrically connected to corresponding module contacts of the interposer assembly at the upper surface of the interposer substrate.

In another embodiment, a communication system is provided including a host circuit board having a mounting area and contact pads within the mounting area and a receptacle assembly mounted to the host circuit board at the mounting area. The receptacle assembly has a cage member including a plurality of walls defining a module cavity providing electrical shielding around the module cavity. The cage member has a port at a front of the cage member open to the module cavity. An interposer assembly is located in the module cavity and coupled to the host circuit board at the mounting area. The interposer assembly has an interposer substrate including an upper surface and a lower surface. The interposer assembly has host circuit board contacts at the lower surface electrically connected to corresponding contact pads of the host circuit board and module contacts at the upper surface. The communication system includes an optical pluggable module extending longitudinally between a mating end and a cable end. The mating end of the pluggable body is loaded into the module cavity of the receptacle assembly through the port. The optical pluggable module includes a mating interface along a bottom of the optical pluggable module facing the interposer assembly. The optical pluggable module includes a module substrate and optical engines coupled to the module substrate. The optical pluggable module has optical fiber cables extending from the optical engines to the cable end. The module substrate has module substrate contacts at a lower surface of the module substrate being electrically connected to corresponding module contacts of the interposer assembly at the upper surface of the interposer substrate.

In a further embodiment, an optical pluggable module is provided including a pluggable body having a mating end and a cable end. The pluggable body has a mating interface along a bottom of the pluggable body. The mating end of the pluggable body is configured to be loaded into a receptacle assembly such that the mating interface faces a host circuit board. The optical pluggable module includes a module substrate having an upper surface and a lower surface with substrate contacts. The upper surface has optical interfaces. The optical pluggable module includes optical engines coupled to the module substrate at the corresponding optical interfaces. The optical engines have optical fiber cables extending therefrom to the cable end. The module substrate contacts are configured to be electrically connected to an interposer assembly of the receptacle assembly.

DETAILED DESCRIPTION OF THE INVENTION

Figure 1:
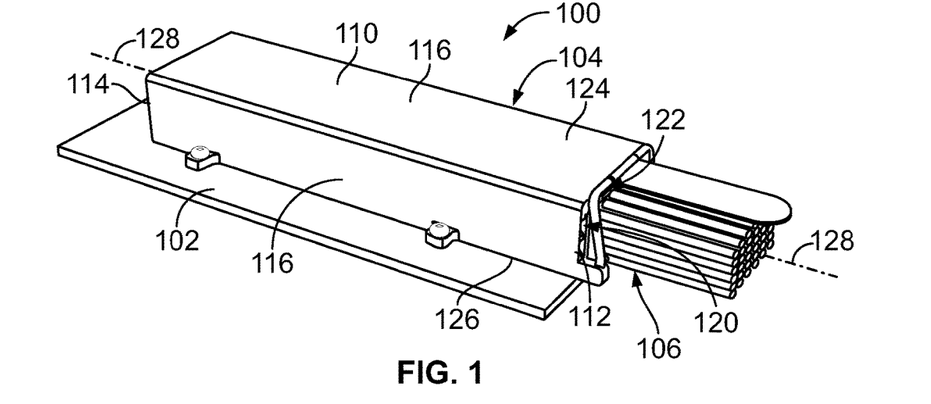
FIG. 1 is a front perspective view of a communication system in accordance with an embodiment.

FIG. 1 is a front perspective view of a communication system 100 in accordance with an embodiment. The communication system 100 includes a host circuit board 102, a receptacle assembly 104 mounted to the host circuit board 102, a pluggable module 106 configured to be received in the receptacle assembly 104 and an interposer assembly 108 (shown in FIG. 2) configured to be received in the receptacle assembly 104. The interposer assembly 108 electrically connects the pluggable module 106 and the host circuit board 102. The interposer assembly 108 is located between the pluggable module 106 and the host circuit board 102. For example, the interposer assembly 108 and the pluggable module are stacked vertically on the host circuit board 102.

The communication system 100 may be part of or used with telecommunication systems or devices. For example, the communication system 100 may be part of or include a switch, router, server, hub, network interface card, or storage system. The host circuit board 102 may be a daughter card or a mother board and include conductive traces (not shown) extending therethrough. In the illustrated embodiment, the pluggable module 106 is an input/output (I/O) module configured to be inserted into and removed from the receptacle assembly 104. The pluggable module 106 is configured to transmit data signals in the form of electrical signals. In various embodiments, the interposer assembly 108 is affixed to the host circuit board 102, such as being soldered to the host circuit board 102 and the pluggable module 106 is connected to the interposer assembly 108 at a separable mating interface, whereby the pluggable module 106 may be readily and repeatedly mated to and unmated from the interposer assembly 108. In other various embodiments, the interposer assembly 108 may form part of the pluggable module 106 that is loaded into and removed from the receptacle assembly 104 for repeated mating to and unmating from the host circuit board 102.

In the illustrated embodiment, the receptacle assembly 104 is illustrated as a single port receptacle assembly configured to receive a single pluggable module 106; however, the receptacle assembly 104 may be a multi-port receptacle assembly in other embodiments configured to receive pluggable modules 106 in multiple ports. For example, the multiple ports of the receptacle assembly 104 may be ganged side-by-side along the top surface of the host circuit board 102.

The receptacle assembly 104 includes a cage member 110 that is mounted to the host circuit board 102. The cage member 110 may be arranged at a bezel or panel (not shown) of a chassis of the system or device, such as through an opening in the panel. As such, the cage member 110 is interior of the device and corresponding panel and the pluggable module(s) 106 is loaded into the cage member 110 from outside or exterior of the device and corresponding panel. Optionally, the panel may include a plurality of openings each configured to receive a corresponding pluggable module 106.

The cage member 110 includes a front end 112 and an opposite rear end 114. The front end 112 may be provided at, and extend through an opening in, the panel. Relative or spatial terms such as "front," "rear," "top," or "bottom" are only used to distinguish the referenced elements and do not necessarily require particular positions or orientations in the communication system 100 or in the surrounding environment of the communication system 100. For example, the front end 112 may be located in or facing a back portion of a larger telecommunication system. In many applications, the front end 112 is viewable to a user when the user is inserting the pluggable module 106 into the receptacle assembly 104. The pluggable module 106 is accessible to the user and viewable to the user when the pluggable module 106 is inserted into the receptacle assembly 104.

The cage member 110 is configured to contain or block interference, such as electromagnetic interference (EMI), and guide the pluggable module(s) 106 during a mating operation. To this end, the cage member 110 includes multiple pieces assembled together to enclose the pluggable module 106 and the interposer assembly 108. For example, the pieces may be snap-fit together and/or welded together. When the cage member 110 is mounted to the host circuit board 102, the cage member 110 is electrically coupled to the host circuit board 102 and, in particular, to ground planes (not shown) within the host circuit board 102 to electrically ground the cage member 110. As such, the receptacle assembly 104 may reduce EMI that may negatively affect electrical performance of the communication system 100. The pluggable module 106 and/or the interposer assembly 108 may be electrically commoned with or grounded to the cage member 110, such as for EMI containment and/or shielding. For example, the pluggable module 106 and/or the interposer assembly 108 may directly engage a portion of the cage member 110, such as an EMI gasket at the opening to the cage member 110.

In an exemplary embodiment, the cage member 110 includes a plurality of housing panels or walls 116, which may be formed from one or more pieces. The various walls 116 provide shielding for vulnerable areas of other components, such as by covering or shielding openings in walls of the other components. The cage member 110 extends between the front end 112 and the rear end 114. The walls 116 are formed from conductive material, such as sheet metal and/or a polymer having conductive particles. In the illustrated embodiment, the pieces are stamped and formed from sheet metal. In some embodiments, the cage member 110 is configured to facilitate airflow through the cage member 110 to transfer heat (or thermal energy) away from the receptacle assembly 104 and the pluggable module(s) 106 and/or the interposer assembly 108. The air may flow from inside the cage member 110 (for example, behind the panel) to the external environment (for example, forward of the panel) or from outside the cage member 110 into the interior of the cage member 110. Fans or other air moving devices may be used to increase airflow through the cage member 110 and over the pluggable module(s) 106.

The cage member 110 defines a module cavity 120 extending between the front and rear ends 112, 114. The cage member 110 has a port 122 at the front end 112 that is open to the module cavity 120. The module cavity 120 receives the pluggable module 106 through the port 122. The module cavity 120 extends lengthwise in a direction that is parallel to a loading axis 128 of the pluggable module 106. For a multi-port receptacle assembly 104, multiple module cavities 120 or ports are defined for receiving multiple pluggable modules 106. In such embodiments, the module cavities 120 may be ganged horizontally. Separator panels may be provided between the module cavities 120 to provide shielding between the module cavities 120.

In an exemplary embodiment, the cage member 110 has a top 124 and a bottom 126. The cage member 110 includes one of the walls 116 at the top 124. The bottom 126 is mounted to the host circuit board 102. In an exemplary embodiment, the bottom 126 is open to allow the pluggable module 106 and the interposer assembly 108 to mate with the host circuit board 102 at the bottom 126.

In an exemplary embodiment, the receptacle assembly 104 may include an EMI gasket (not shown) at the front end 112 of the cage member 110. The EMI gasket may interface with the panel, such as within the opening in the panel that receives the receptacle assembly 104. The EMI gasket may extend into the module cavity 120 to engage the pluggable module 106.

Figure 2:
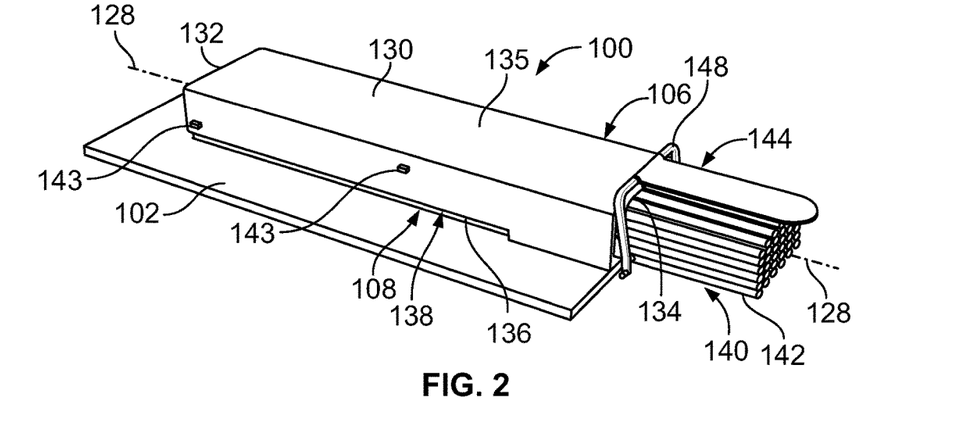
FIG. 2 is a perspective view of a portion of the communication system showing a pluggable module 106 and an interposer assembly in accordance with an exemplary embodiment.

FIG. 2 is a perspective view of a portion of the communication system 100 showing the pluggable module 106 and the interposer assembly 108 in accordance with an exemplary embodiment. The cage member 110 (FIG. 1) has been removed to illustrate the pluggable module 106 and the interposer assembly 108 stacked on the host circuit board 102. The interposer assembly 108 is configured to directly mate with the host circuit board 102 along the length of the host circuit board 102, such as directly below the pluggable module 106. The pluggable module 106 is configured to directly mate with the interposer assembly 108.

The pluggable module 106 has a pluggable body 130, which may be defined by one or more shells. The pluggable module 106 has one or more cable assemblies 140 held by the pluggable body 130. Optionally, the pluggable body 130 may provide heat transfer for the cable assemblies 140. The pluggable body 130 includes a rear end or mating end 132 and an opposite front end or cable end 134. The mating end 132 is configured to be inserted into the module cavity 120 (shown in FIG. 1). Each cable assembly 140 has one or more cables 142 extending from the cable end 134 that may be routed to another component within the system.

The pluggable body 130 has a top 135 and a bottom 136. The bottom 136 faces the interposer assembly 108 and the host circuit board 102. The bottom 136 defines an interface 138 configured to be mated to the interposer assembly 108. The top 135 and the bottom 136 extend longitudinally between the mating end 132 and the cable end 134. In an exemplary embodiment, the pluggable module 106 is loaded into the cage member 110 in a first mating direction along the loading axis 128, which may be generally parallel to the host circuit board 102. The pluggable module 106 may be mated with the interposer assembly 108 in a second mating direction, which may be generally perpendicular to the first mating direction. For example, the pluggable body 130 may be pressed downward toward the interposer assembly 108 and the host circuit board 102 to directly mate the pluggable module 106 with the interposer assembly 108. Optionally, the cage member 110 may include features that engage the pluggable body 130 and force the pluggable body 130 in the downward mating direction toward the host circuit board 102. For example, the cage member 110 may include guide tracks or guide rails that define a movement path of the pluggable body 130 during loading and mating. In the illustrated embodiment, the pluggable body 130 includes guide features 143 extending from the sides that are configured to be received in the guide tracks of the cage member 110 to guide movement of the pluggable body 130 during loading and mating.

In an exemplary embodiment, the pluggable module 106 includes a latch 144 for latchably securing the pluggable module 106 to the cage member 110 and/or the host circuit board 102. The latch 144 may include a latching feature (not shown) configured to engage the cage member 110 and/or the host circuit board 102. The latching feature may be released to release the pluggable module 106 to allow the pluggable module 106 to be removed from the cage member 110. In an exemplary embodiment, the latch 144 includes an actuator 148, such as a clip and a pull tab, used to actuate the latch 144. The actuator 148 may be used to press or force the pluggable module 106 into the cage member 110 and/or may be used to pull the pluggable module 106 out of the cage member 110.

Figure 3:
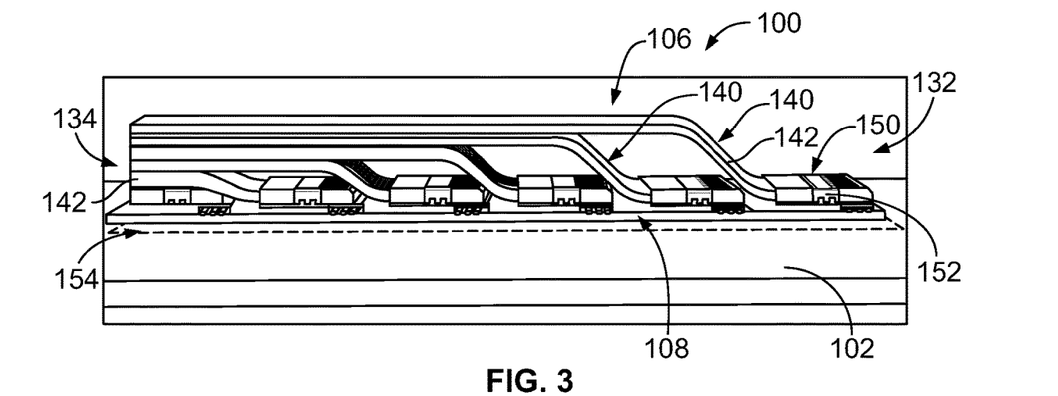
FIG. 3 is a perspective view of a portion of the communication system showing a portion of the pluggable module relative to a host circuit board.

FIG. 3 is a perspective view of a portion of the communication system 100 showing a portion of the pluggable module 106 relative to the host circuit board 102. The cage member 110 (shown in FIG. 1) and the pluggable body 130 (shown in FIG. 2) are removed to illustrate the cable assemblies 140 in accordance with an exemplary embodiment. Any number of cable assemblies 140, including a single cable assembly 140, may be provided depending on the particular application and the number of signal lines transmitted by the pluggable module 106.

Each cable assembly 140 includes the cables 142. The cable assembly 140 includes a cable connector 150 at ends of the cables 142. In an exemplary embodiment, the cable connector 150 includes a ground shield 152 surrounding portions of the cables 142 and other components of the cable connector 150, such as components configured to be directly mated with the interposer assembly 108, as described in further detail below. The ground shield 152 provides electrical shielding for the cables 142 and other components of the cable connector 150.

The cables 142 and the cable connector 150 are configured to be housed within the pluggable body 130. The cable connector 150 is loaded into and removed from the cage member 110 with the pluggable body 130 and is configured to be mated to the interposer assembly 108 during loading of the pluggable body 130 into the cage member 110. Optionally, the pluggable module 106 may include multiple cable connectors 150 within the pluggable body 130 that are each individually mated with the interposer assembly 108 or with corresponding interposer assemblies 108, such as when a plurality of interposer assemblies 108 are used rather than a single interposer assembly 108. For example, multiple cable connectors 150 may be longitudinally spaced between the mating end 132 and the cable end 134 of the pluggable body 130.

The interposer assembly 108 is configured to be directly mated with the host circuit board 102 at a mounting area 154 of the host circuit board 102. For example, the interposer assembly 108 may be soldered or otherwise electrically connected to signal contact pads (for example, traces or circuits) and ground contact pad (for example, traces, circuits or a ground layer) within the mounting area 154. The receptacle assembly 104 (shown in FIG. 1) is configured to be mounted to the host circuit board 102 at the mounting area 154. For example, the cage member 110 may be terminated to the host circuit board 102 at the mounting area 154, such as to ground vias in the host circuit board 102.

Figure 4:
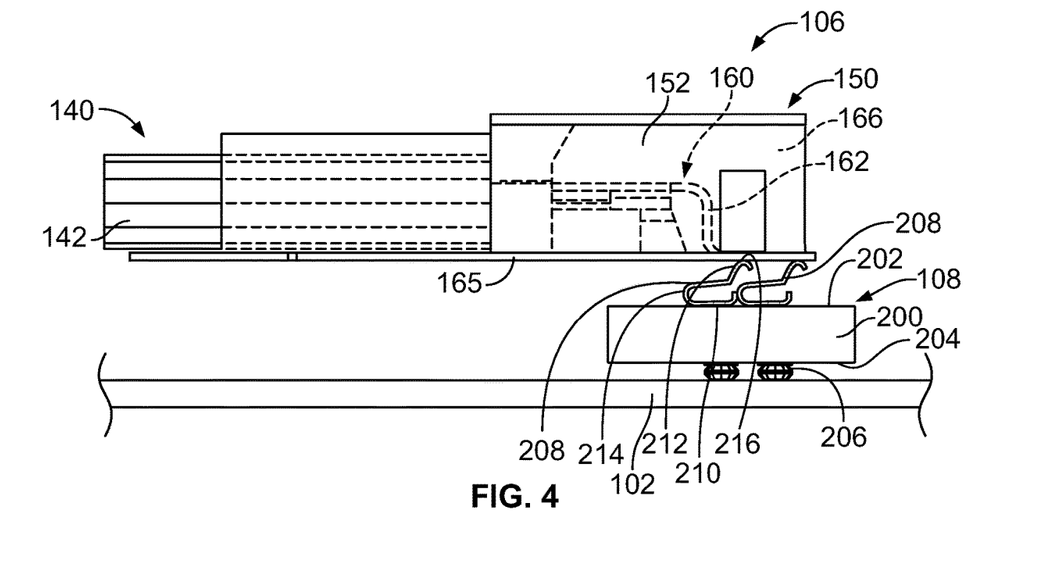
FIG. 4 is a side view of a portion of the pluggable module showing a cable assembly and the corresponding interposer assembly in accordance with an exemplary embodiment.
Figure 5:
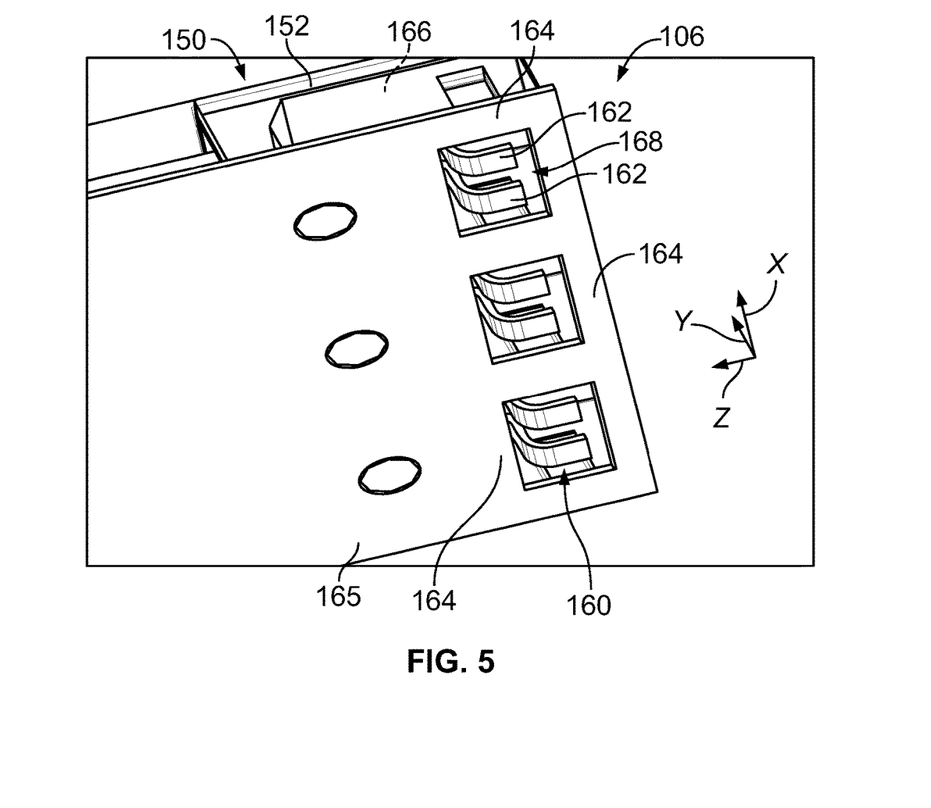
FIG. 5 is a bottom perspective view of a portion of the pluggable module showing a portion of the cable assembly in accordance with an exemplary embodiment.

FIG. 4 is a side view of a portion of the pluggable module 106 showing one of the cable assemblies 140 and the corresponding interposer assembly 108 in accordance with an exemplary embodiment. FIG. 5 is a bottom perspective view of a portion of the pluggable module 106 showing a portion of the cable assembly 140 in accordance with an exemplary embodiment.

The cable connector 150 includes a contact assembly 160 configured to be terminated to the cables 142 of the cable assembly 140. The contact assembly 160 is configured to be directly mated with the interposer assembly 108 (FIG. 5). The contact assembly 160 includes a plurality of signal contacts 162 and one or more ground contacts 164. In the illustrated embodiment, the ground contact 164 is defined by a ground plate 165. The ground shields 152 are terminated to the ground plate 165. For example, the ground shields 152 may include press-fit pins pressed into the ground plate 165 to make an electrical connection between the ground shields 152 and the ground plate 165. The ground plate 165 has a plurality of mating interfaces for mating with the interposer assembly 108. The contact assembly 160 includes a contact holder 166 that holds the signal contacts 162 and/or the ground contacts 164. The contact holder 166 may be overmolded over the signal contacts 162 in an exemplary embodiment. The ground plate 165 includes openings 168 that receive ends of the signal contacts 162. The ends of the signal contacts 162 may be coplanar with the ground plate 165.

In an exemplary embodiment, the contact assembly 160 is an overmolded leadframe. The signal contacts 162 are formed from a stamped and formed leadframe that is overmolded by an overmolded body that forms the contact holder 166. For example, the signal contacts 162 may be stamped from a common sheet of metal and held together by a carrier strip prior to being overmolded by the overmolded body. Once overmolded, the carrier strip may be removed thus electrically separating the signal contacts 162 from each other.

In an exemplary embodiment, the signal contacts 162 are arranged in pairs configured to convey differential signals. The ground contacts 164 may separate pairs of the signal contacts 162 to provide electrical shielding between the pairs of signal contacts 162. For example, the ground plate 165 may be positioned between the pairs of signal contacts 162 and the ground shields 152 may be positioned between the pairs of signal contacts 162. Optionally, the ground plate 165 and the ground shields 152 may form shield pockets around each pair of signal contacts 162 to shield the pairs of signal contacts 162 from each other. Other arrangements are possible in alternative embodiments.

With reference to FIG. 4, in an exemplary embodiment, the interposer assembly 108 includes an interposer substrate 200 including an upper surface 202 and a lower surface 204. The interposer substrate 200 may be an interposer circuit board in various embodiments. The interposer substrate 200 may be a structure other than a circuit board in other various embodiments, such as an overmolded leadframe. The interposer assembly 108 includes host circuit board contacts 206 at the lower surface 204 configured to be electrically connected to corresponding contact pads on the host circuit board 102. The interposer assembly 108 includes cable assembly contacts 208 at the upper surface 202 configured to be electrically connected to corresponding signal contacts 162 and ground contacts 164 of the contact assembly 160.

In the illustrated embodiment, the host circuit board contacts 206 are defined by solder balls. For example, the host circuit board contacts 206 are a ball grid array at the lower surface 204 of the interposer substrate 200. The solder balls are configured to be reflow soldered to the host circuit board 102. Other types of contacts may be used for the host circuit board contacts 206 in alternative embodiments, such as spring contacts, a land grid array, or other types of contacts. Once the host circuit board contacts 206 are soldered to the host circuit board 102, the interposer assembly 108 is non-removably coupled to the host circuit board 102. The pluggable module 106 may be mated to and unmated from the interposer assembly 108 without removing the interposer assembly 108 from the host circuit board 102.

In the illustrated embodiment, the cable assembly contacts 208 are spring contacts configured to be mated to the pluggable module 106. Each cable assembly contact 208 includes a terminating end 210 and a mating end 212. Each cable assembly contact 208 includes a deflectable spring beam 214 between the terminating end 210 and the mating end 212. The terminating end 210 is configured to be terminated to the interposer substrate 200. For example, the terminating end 210 may include a solder pad configured to be soldered to the upper surface 202 of the interposer substrate 200 or the terminating end 210 may include a press-fit pin configured to be press-fit into a plated via of the interposer substrate 200. The mating end 212 defines a separable mating interface 216 to the contact assembly 160. The contact assembly 160 may be mated to and unmated from the separable mating interface 216 reliably and repeatably without detrimentally damaging the cable assembly contacts 208 or the contacts 162, 164 of the contact assembly 160. The deflectable spring beams 214 are configured to be elastically deformed when mated with the contact assembly 160. The deflectable spring beams 214 create a reliable electrical connection between the cable assembly contacts 208 and the contacts 162, 164 of the contact assembly 160.

Figure 6:
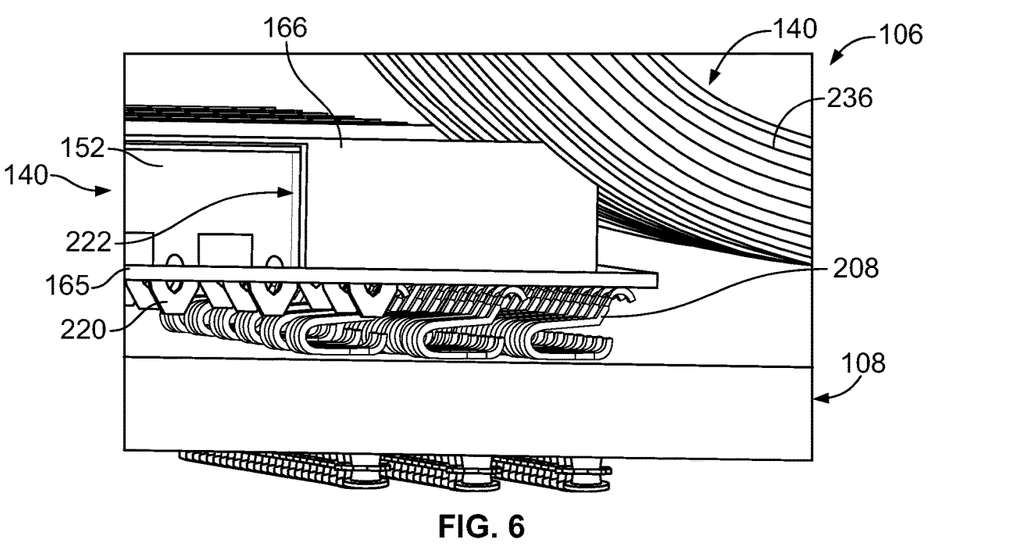
FIG. 6 is a side perspective view of a portion of the pluggable module showing a cable assembly coupled to the interposer assembly.

FIG. 6 is a side perspective view of a portion of the pluggable module 106 showing one of the cable assemblies 140 coupled to the interposer assembly 108. In an exemplary embodiment, the cable assembly contacts 208 may be arranged in multiple rows for engaging the signal contacts 162 and the ground contacts 164 (both shown in FIG. 4). The cable assembly contacts 208 electrically connected to the ground contacts 164 provide electrical shielding for the cable assembly contacts 208 electrically connected to the signal contacts 162. Optionally, signal contacts of the cable assembly contacts 208 may be arranged in pairs and surrounded, such as on all four sides, by corresponding ground contacts of the cable assembly contacts 208.

In the illustrated embodiment, the ground plate 165 defines the ground contacts 164. The ground shields 152 are electrically connected to the ground plate 165 by ground pins 220, such as press-fit pins. The ground shields 152 and the ground plate 165 define shield pockets 222 for the signal contacts 162. The contact holder 166 is received in the shield pockets 222.

Figure 7:
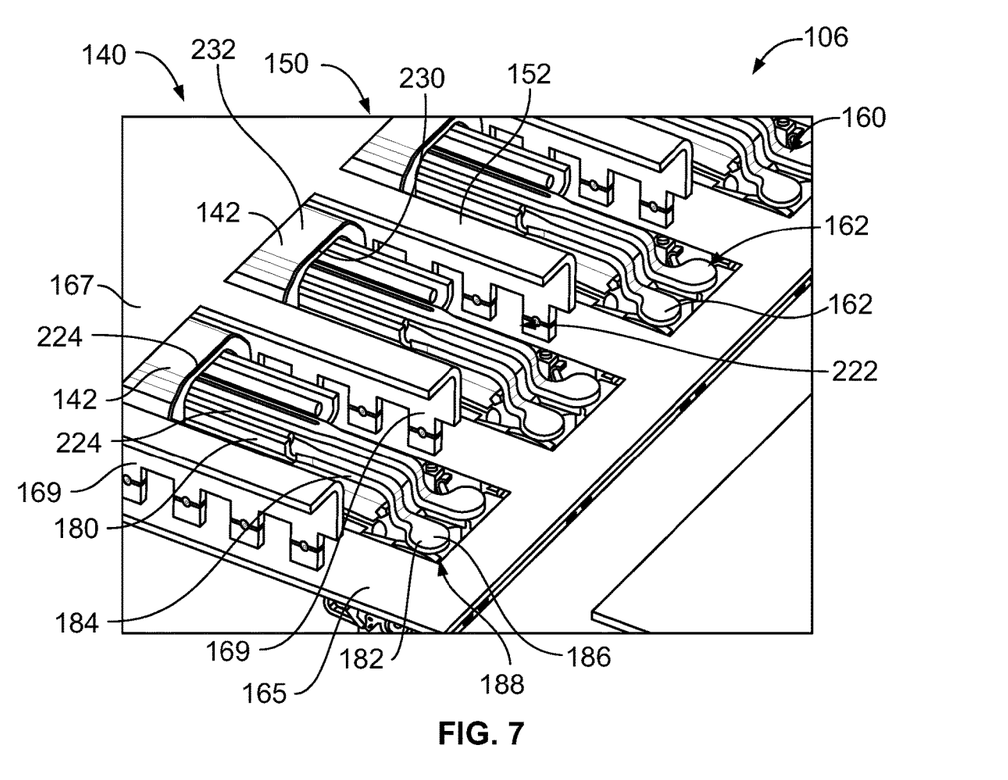
FIG. 7 is a top perspective view of a portion of the pluggable module showing a portion of a cable assembly.

FIG. 7 is a top perspective view of a portion of the pluggable module 106 showing a portion of one of the cable assemblies 140. In an exemplary embodiment, the contact assembly 160 includes the ground plate 165, which defines a lower ground plate, and an upper ground plate 167 spaced apart from an elevated above the lower ground plate 165. The upper ground plate 167 may form part of the ground shields 152. The ground shields 152 include side walls 169 extending between the upper ground plate 167 and the lower ground plate 165. The ground plates 165, 167 and the sidewalls 169 define the shield pockets 222.

In an exemplary embodiment, each cable 142 may be a twin-axial cable having a pair of signal conductors 224 with an insulator(s) 230 surrounding the signal conductors 224 and a cable shield 232 providing electrical shielding for the pair of signal conductors 224. Optionally, each cable 142 may include a drain wire (not shown). Each cable 142 includes a cable jacket 236 (shown in FIG. 6) that protects the cable 142. Other types of cables 142 may be used in alternative embodiments. The cables 142 are received in corresponding shield pockets 222. In an exemplary embodiment, the lower ground plate 165 and/or the upper ground plate 167 and/or the sidewalls 169 may be electrically connected to the exposed cable shield 232 in the shield pocket 222 to electrically connect the cable 142 to the cable connector 150.

Each of the signal contacts 162 includes a terminating end 180, a mating end 182 opposite the terminating end 180 and an intermediate portion 184 between the terminating end 180 and the mating end 182. In an exemplary embodiment, the intermediate portion 184 is held by the contact holder 166 (FIG. 6). For example, the intermediate portions 184 may be overmolded. Optionally, the intermediate portion 184 may be necked down or narrower than other portions, such as to allow more dielectric material between the signal contacts 162 and between the signal contacts 162 and the sidewalls 169 and/or for signal integrity through the contact holder 166.

The terminating end 180 is terminated to a corresponding signal conductor 224 of the cable 142. For example, the end of the cable 142 may be stripped exposing a length of the signal conductor 224. The signal conductor 224 may be soldered to the terminating end 180. The signal conductor 224 may be terminated to the terminating end 180 by other means in alternative embodiments, such as by crimping, an insulation displacement connection, or another type of termination. The contact holder 166 may be used for spacing apart the signal conductors 224 at a predetermined pitch matching the pitch of the signal conductors 224 for termination thereto.

The mating end 182 is configured to be directly mated to the cable assembly contacts 208 (shown in FIG. 6). In an exemplary embodiment, the signal contact 162 includes a pad 186 at the mating end 182 defining a separable mating interface 188 at the distal end for repeated mating and on mating with the cable assembly contacts 208. Other types of mating ends 182 may be provided in alternative embodiments, such as a mating end having a deflectable spring beam. The pad 186 is matable with the cable assembly contact 208 in a horizontal loading direction and/or a vertical mating direction. For example, the pluggable module 106 is loaded in the loading direction and may be moved downward into contact with the cable assembly contact 208 at the final stages of loading to create downward pressure on the cable assembly contacts 208 when mated thereto. The downward pressure compresses the deflectable spring beams of the cable assembly contacts 208 such that the deflectable spring beams are spring biased against the mating ends 182 of the signal contacts 162.

Figure 8:
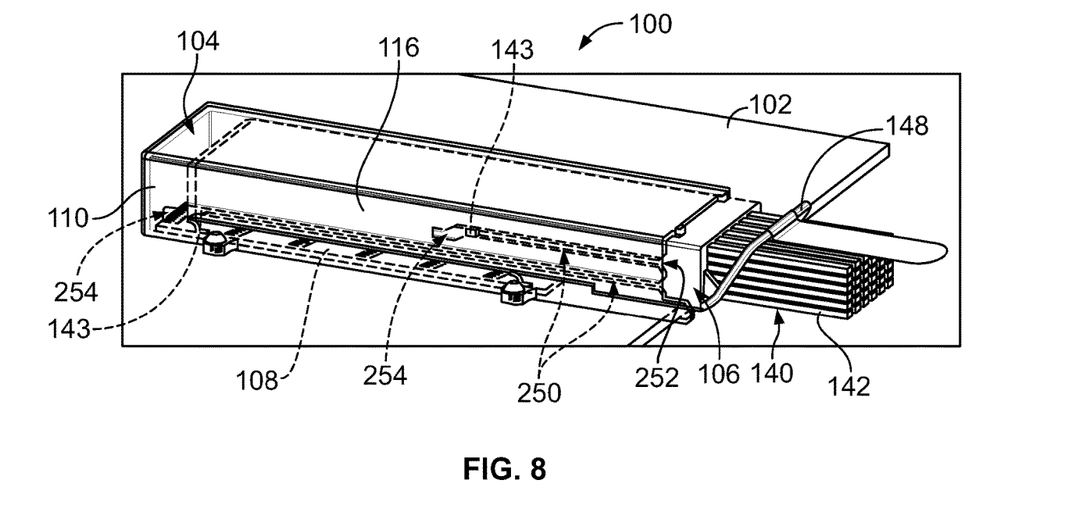
FIG. 8 is a front perspective view of the communication system in accordance with an embodiment showing the pluggable module in a partially loaded position.
Figure 9:
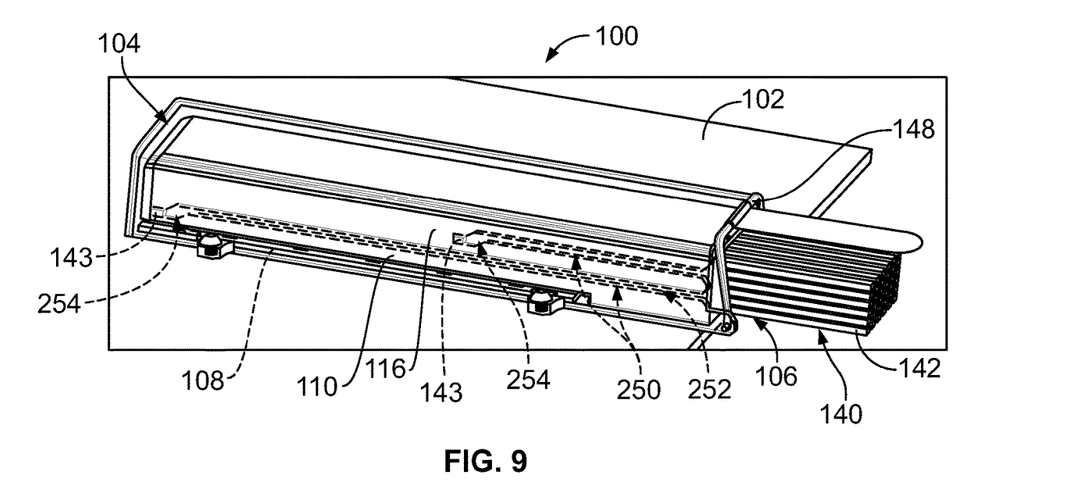
FIG. 9 is a front perspective view of the communication system in accordance with an exemplary embodiment showing the pluggable module in a fully loaded position.

FIG. 8 is a front perspective view of the communication system 100 in accordance with an embodiment showing the pluggable module 106 in a partially loaded position. FIG. 9 is a front perspective view of the communication system 100 in accordance with an exemplary embodiment showing the pluggable module 106 in a fully loaded position. The cage member 110 of the receptacle assembly 104 includes guide features 250 along the walls 116. In the illustrated embodiment, the guide features 250 are guide tracks 252 configured to receive the guide features 143 of the pluggable module 106.

In an exemplary embodiment, the guide tracks 252 include seating portions 254 that are used to seat the pluggable module 106 to the interposer assembly 108. For example, at the distal ends of the guide tracks 252, the guide tracks 252 are stepped downward to define the seating portions 254. As the pluggable module 106 is loaded into the receptacle assembly 104, the guide features 143 ride in the guide tracks 252 to the seating portions 254. At the seating portions 254, the pluggable module 106 is forced downward toward the host circuit board 102 as the pluggable module 106 is continued to be loaded into the receptacle assembly 104. In the illustrated embodiment, the seating portions 254 are ramped at an angle such that the pluggable module 106 has both horizontal and vertical movement in the seating portion 254. As the pluggable module 106 is forced downward toward the host circuit board 102, the pluggable module 106 is electrically connected to the interposer assembly 108. The signal contacts 162 and the ground contacts 164 are mated to the cable assembly contacts 208 of the interposer assembly 108. The cable assembly contacts 208 are compressed when mated with the pluggable module 106.

In an exemplary embodiment, the actuator 148 of the latch 144 may be used to force the pluggable module 106 in the loading direction. For example, the operator may press on the actuator 148 to push the pluggable module 106 in the loading direction. During removal, the operator may pull in the actuator 148 to remove the pluggable module 106 from the receptacle assembly 104. During removal, the guide tracks 252 may guide removal of the pluggable module 106. The guide features 143 ride in the guide tracks 252 during removal. Other types of latching features and guide features may be used in alternative embodiments.

Figure 10:
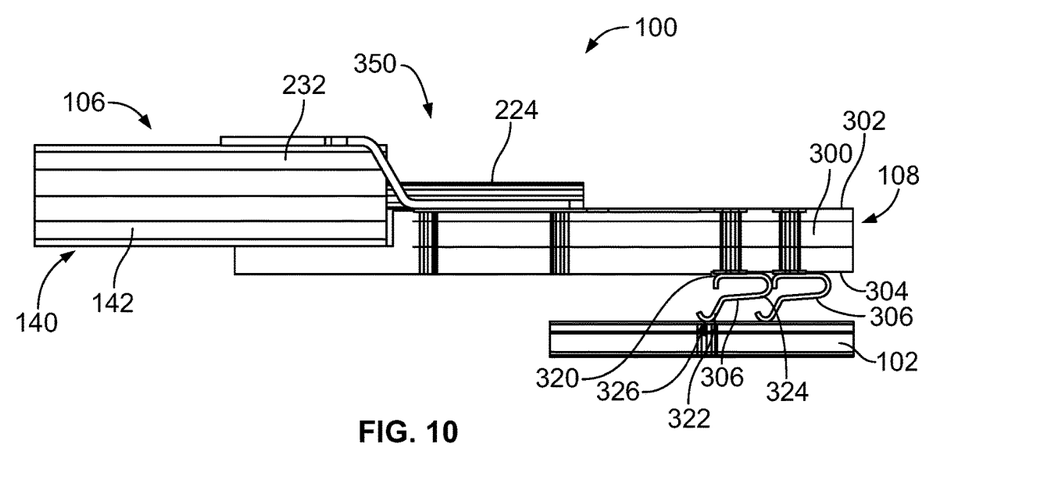
FIG. 10 is a side view of a portion of the communication system in accordance with an exemplary embodiment showing a portion of the pluggable module relative to the host circuit board.
Figure 11:
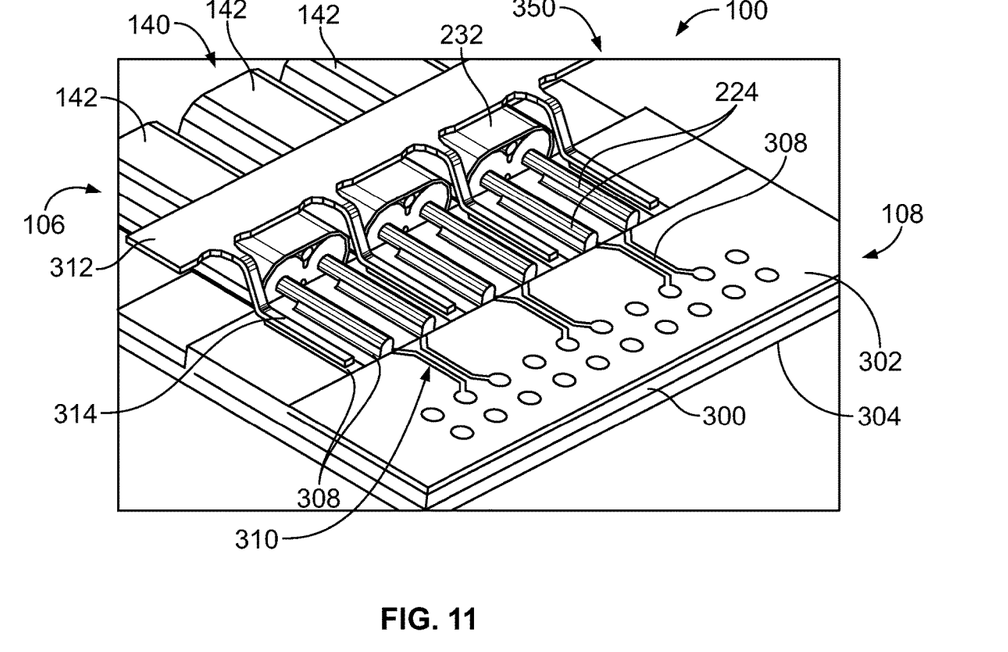
FIG. 11 is a top perspective view of a portion of the pluggable module in accordance with an exemplary embodiment.

FIG. 10 is a side view of a portion of the communication system 100 in accordance with an exemplary embodiment showing a portion of the pluggable module 106 relative to the host circuit board 102. FIG. 11 is a top perspective view of a portion of the pluggable module 106 in accordance with an exemplary embodiment. The embodiment illustrated in FIGS. 10-11 utilizes the interposer assembly 108 as part of the pluggable module 106. The interposer assembly 108 defines a connector assembly 350 terminated to the ends of the cables 142 of the cable assembly 140. The interposer assembly 108 is configured to be loaded into and unloaded from the receptacle assembly 104 (shown in FIG. 1) with the pluggable module 106.

The interposer assembly 108 includes an interposer substrate 300 including an upper surface 302 and a lower surface 304. The interposer substrate 300 may be an interposer circuit board in various embodiments. The interposer substrate 300 may be a structure other than a circuit board in other various embodiments, such as an overmolded leadframe. The interposer assembly 108 includes host circuit board contacts 306 at the lower surface 304 configured to be electrically connected to corresponding contact pads on the host circuit board 102. The interposer assembly 108 includes cable assembly contacts 308 at the upper surface 302 configured to be electrically connected to the cables 142.

In the illustrated embodiment, the cable assembly contacts 308 are defined by circuits 310 of the interposer substrate 300. For example, the circuits 310 may include traces, vias, solder pads and the like. In an exemplary embodiment, the signal conductors 224 of the cables 142 are terminated directly to the circuits 310. For example, the signal conductors 224 may be soldered to the circuits 310. In an exemplary embodiment, a ground bus 312 is electrically coupled to the cable shields 232 of the cables 142 and ground contacts 314 of the ground bus 312 are terminated directly to the circuits 310. For example, the ground contacts 314 may be soldered to the circuits 310. Other types of contacts may be used for the host circuit board contacts 306 in alternative embodiments, such as spring contacts, insulation displacement contacts, crimp contacts, and the like. Once the cable assembly contacts 308 are terminated to the cables 142, the interposer assembly 108 is non-removably coupled to the cable assembly 140. Optionally, the ends of the cables 142 may be overmolded to the interposer substrate 300 to form a strain relief between the cables 142 and the interposer substrate 300. The interposer assembly 108 and the pluggable module 106 may be mated to and unmated from the host circuit board 102 without removing the interposer assembly 108 from the cable assembly 140 of the pluggable module 106.

In the illustrated embodiment, the host circuit board contacts 306 are spring contacts configured to be mated to the host circuit board 102. Each host circuit board contact 306 includes a terminating end 320 and a mating end 322. Each host circuit board contacts 306 includes a deflectable spring beam 324 between the terminating end 320 and the mating end 322. The terminating end 320 is configured to be terminated to the interposer substrate 300. For example, the terminating end 320 may include a solder pad configured to be soldered to the lower surface 304 of the interposer substrate 300 or the terminating end 320 may include a press-fit pin configured to be press-fit into a plated via of the interposer substrate 300. The mating end 322 defines a separable mating interface 326 to the host circuit board 102. The interposer assembly 108 may be mated to and unmated from the host circuit board 102 at the separable mating interfaces 326 reliably and repeatably without detrimentally damaging the host circuit board contacts 306 or the host circuit board 102. The deflectable spring beams 324 are configured to be elastically deformed when mated with the host circuit board 102. The deflectable spring beams 324 create a reliable electrical connection between the host circuit board contacts 306 and the host circuit board 102.

Figure 12:
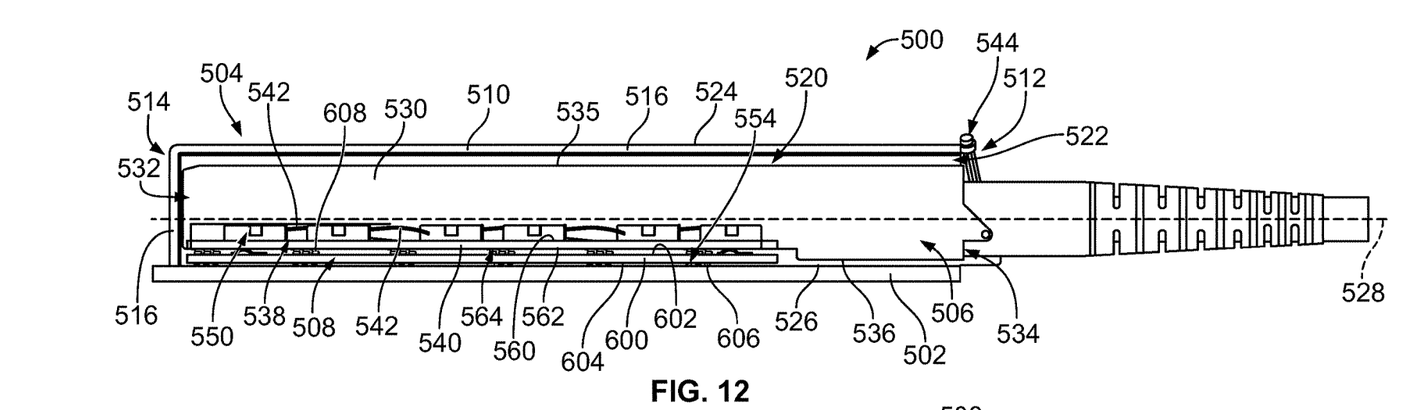
FIG. 12 is a cross-sectional view of a communication system in accordance with an embodiment.
Figure 13:
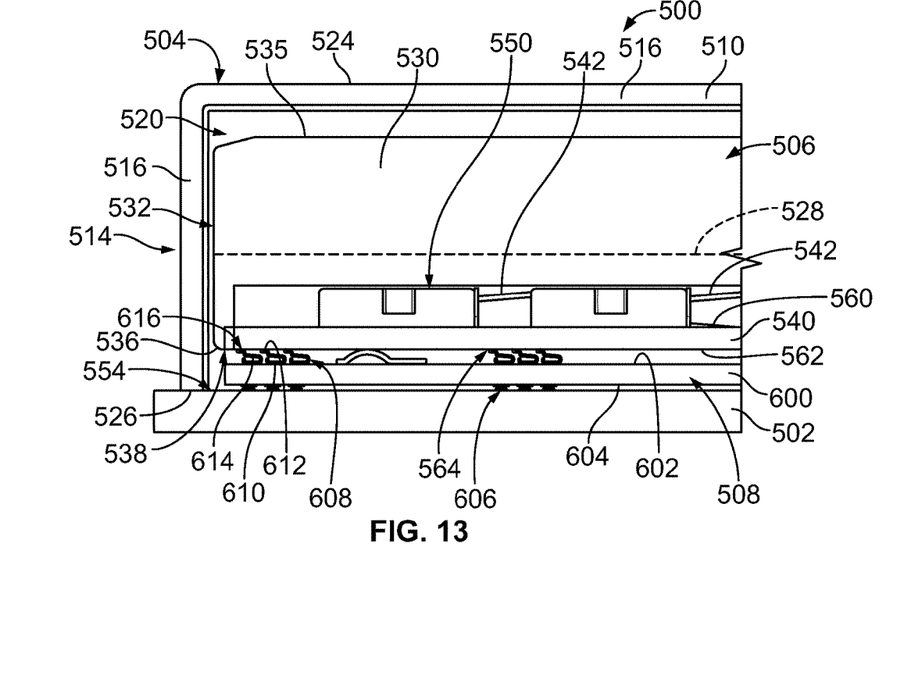
FIG. 13 is an enlarged cross-sectional view of a portion of the communication system shown in FIG. 12 in accordance with an exemplary embodiment.

FIG. 12 is a cross-sectional view of a communication system 500 in accordance with an embodiment. FIG. 13 is an enlarged cross-sectional view of a portion of the communication system 100 in accordance with an exemplary embodiment. The communication system 500 is similar to the communication system 100 and includes similar components and features. The communication system 500 includes an optical pluggable module 506 rather than the electrical pluggable module 106 of the communication system 100.

The communication system 500 includes a host circuit board 502, a receptacle assembly 504 mounted to the host circuit board 502, and an interposer assembly 508 received in the receptacle assembly 504. The interposer assembly 508 is coupled to the host circuit board 502. The optical pluggable module 506 is configured to be received in the receptacle assembly 504 to couple to the interposer assembly 508. The interposer assembly 508 electrically connects the optical pluggable module 506 and the host circuit board 502. The interposer assembly 508 is located between the optical pluggable module 506 and the host circuit board 502. For example, the interposer assembly 508 and the pluggable module are stacked vertically on the host circuit board 502.

The communication system 500 may be part of or used with telecommunication systems or devices. For example, the communication system 500 may be part of or include a switch, router, server, hub, network interface card, or storage system. The host circuit board 502 may be a daughter card or a mother board and include conductive traces (not shown) extending therethrough. The optical pluggable module 506 is configured to transmit data signals in the form of optical signals. In various embodiments, the interposer assembly 508 is affixed to the host circuit board 502, such as being soldered to the host circuit board 502 and the optical pluggable module 506 is connected to the interposer assembly 508 at a separable mating interface, whereby the optical pluggable module 506 may be readily and repeatedly mated to and unmated from the interposer assembly 508. In other various embodiments, the interposer assembly 508 may form part of the optical pluggable module 506 that is loaded into and removed from the receptacle assembly 504 for repeated mating to and unmating from the host circuit board 502.

In the illustrated embodiment, the receptacle assembly 504 is illustrated as a single port receptacle assembly configured to receive a single optical pluggable module 506; however, the receptacle assembly 504 may be a multi-port receptacle assembly in other embodiments configured to receive multiple optical pluggable modules 506 in multiple ports. For example, the multiple ports of the receptacle assembly 504 may be ganged side-by-side along the top surface of the host circuit board 502.

The receptacle assembly 504 includes a cage member 510 that is mounted to the host circuit board 502. The cage member 510 may be similar to the cage member 110. The cage member 510 includes a front end 512 and an opposite rear end 514. In an exemplary embodiment, the cage member 510 includes a plurality of housing panels or walls 516, which may be formed from one or more pieces. The walls 516 are formed from conductive material, such as sheet metal and/or a polymer having conductive particles to provide electrical shielding. The cage member 510 defines a module cavity 520 extending between the front and rear ends 512, 514. The cage member 510 has a port 522 at the front end 512 that is open to the module cavity 520. The module cavity 520 receives the optical pluggable module 506 through the port 522. The module cavity 520 extends lengthwise in a direction that is parallel to a loading axis 528 of the optical pluggable module 506. In an exemplary embodiment, the cage member 510 has a top 524 and a bottom 526. The bottom 526 is mounted to the host circuit board 502. In an exemplary embodiment, the bottom 526 is open to allow the optical pluggable module 506 and the interposer assembly 508 to mate with the host circuit board 502 at the bottom 526. The interposer assembly 508 is configured to directly mate with the host circuit board 502 along the length of the host circuit board 502, such as directly below the optical pluggable module 506. The optical pluggable module 506 is configured to directly mate with the interposer assembly 508.

The optical pluggable module 506 has a pluggable body 530, which may be defined by one or more shells. The optical pluggable module 506 includes a module substrate 540 and one or more optical engines 550 coupled to the module substrate 540. The module substate 540 is held by the pluggable body 530. The pluggable body 530 includes a rear end or mating end 532 and an opposite front end or cable end 534. The mating end 532 is configured to be inserted into the module cavity 520. Optical fiber cables 542 extending from the optical engines 550 to the cable end 534 and may be routed to another component within the system.

The pluggable body 530 has a top 535 and a bottom 536. The bottom 536 faces the interposer assembly 508 and the host circuit board 502. The bottom 536 defines an interface 538 configured to be mated to the interposer assembly 508. The top 535 and the bottom 536 extend longitudinally between the mating end 532 and the cable end 534. In an exemplary embodiment, the optical pluggable module 506 is loaded into the cage member 510 in a first mating direction along the loading axis 528, which may be generally parallel to the host circuit board 502. The optical pluggable module 506 may be mated with the interposer assembly 508 in a second mating direction, which may be generally perpendicular to the loading direction. For example, the pluggable body 530 may be pressed downward toward the interposer assembly 508 and the host circuit board 502 to directly mate the optical pluggable module 506 with the interposer assembly 508. Optionally, the cage member 510 may include features that engage the pluggable body 530 and force the pluggable body 530 in the downward mating direction toward the host circuit board 502. For example, the cage member 510 may include guide tracks or guide rails that define a movement path of the pluggable body 530 during loading and mating. In the illustrated embodiment, the pluggable body 530 includes guide features extending from the sides that are configured to be received in the guide tracks of the cage member 510 to guide movement of the pluggable body 530 during loading and mating.

In an exemplary embodiment, the optical pluggable module 506 includes a latch 544 for latchably securing the optical pluggable module 506 to the cage member 510 and/or the host circuit board 502. The latch 544 may include a latching feature (not shown) configured to engage the cage member 510 and/or the host circuit board 502. The latching feature may be released to release the optical pluggable module 506 to allow the optical pluggable module 506 to be removed from the cage member 510. In an exemplary embodiment, the latch 544 includes an actuator, such as a clip and a pull tab, used to actuate the latch 544. The actuator may be used to press or force the optical pluggable module 506 into the cage member 510 and/or may be used to pull the optical pluggable module 506 out of the cage member 510.

The module substrate 540 includes an upper surface 560 and a lower surface 562. The module substrate 540 has module substrate contacts 564 at the lower surface 562. The module substrate contacts 564 are configured to be electrically connected to the interposer assembly 508. The module substrate contacts 564 may be contact pads, circuit traces, vias, or other types of conductors. The optical engines 550 are mounted to the upper surface 560. The optical engines 550 may be electrically connected to the module substrate 540, such as being soldered to contacts of the module substrate 540 or being press fit to vias of the module substrate 540. The optical engines 550 include electrical-to-optical converters to convert between electrical signals and optical signals. The optical fiber cables 542 are optically coupled to the electrical-to-optical converters.

The interposer assembly 508 is configured to be directly mated with the host circuit board 502 at a mounting area 554 of the host circuit board 502. For example, the interposer assembly 508 may be soldered or otherwise electrically connected to signal contact pads (for example, traces or circuits) and ground contact pad (for example, traces, circuits or a ground layer) within the mounting area 554. The receptacle assembly 504 (shown in FIG. 12) is configured to be mounted to the host circuit board 502 at the mounting area 554. For example, the cage member 510 may be terminated to the host circuit board 502 at the mounting area 554, such as to ground vias in the host circuit board 502.

In an exemplary embodiment, the interposer assembly 508 includes an interposer substrate 600 including an upper surface 602 and a lower surface 604. The interposer substrate 600 may be an interposer circuit board in various embodiments. The interposer substrate 600 may be a structure other than a circuit board in other various embodiments, such as an overmolded leadframe. The interposer assembly 508 includes host circuit board contacts 606 at the lower surface 604 configured to be electrically connected to corresponding contact pads on the host circuit board 502. In the illustrated embodiment, the host circuit board contacts 606 are defined by solder balls. The optical pluggable module 506 may be mated to and unmated from the interposer assembly 508 without removing the interposer assembly 508 from the host circuit board 502.

The interposer assembly 508 includes module contacts 608 at the upper surface 602 configured to be electrically connected to corresponding module substrate contacts 564 of the module substrate 540. In the illustrated embodiment, the module contacts 608 are spring contacts configured to be mated to the optical pluggable module 506. Each module contact 608 includes a deflectable spring beam 614 between a terminating end 610 and a mating end 612. The terminating end 610 is configured to be terminated to the interposer substrate 600. The mating end 612 defines a separable mating interface to the contact assembly 560. The contact assembly 560 may be mated to and unmated from the separable mating interface 616 reliably and repeatably without detrimentally damaging the module contacts 608.

Figure 14:
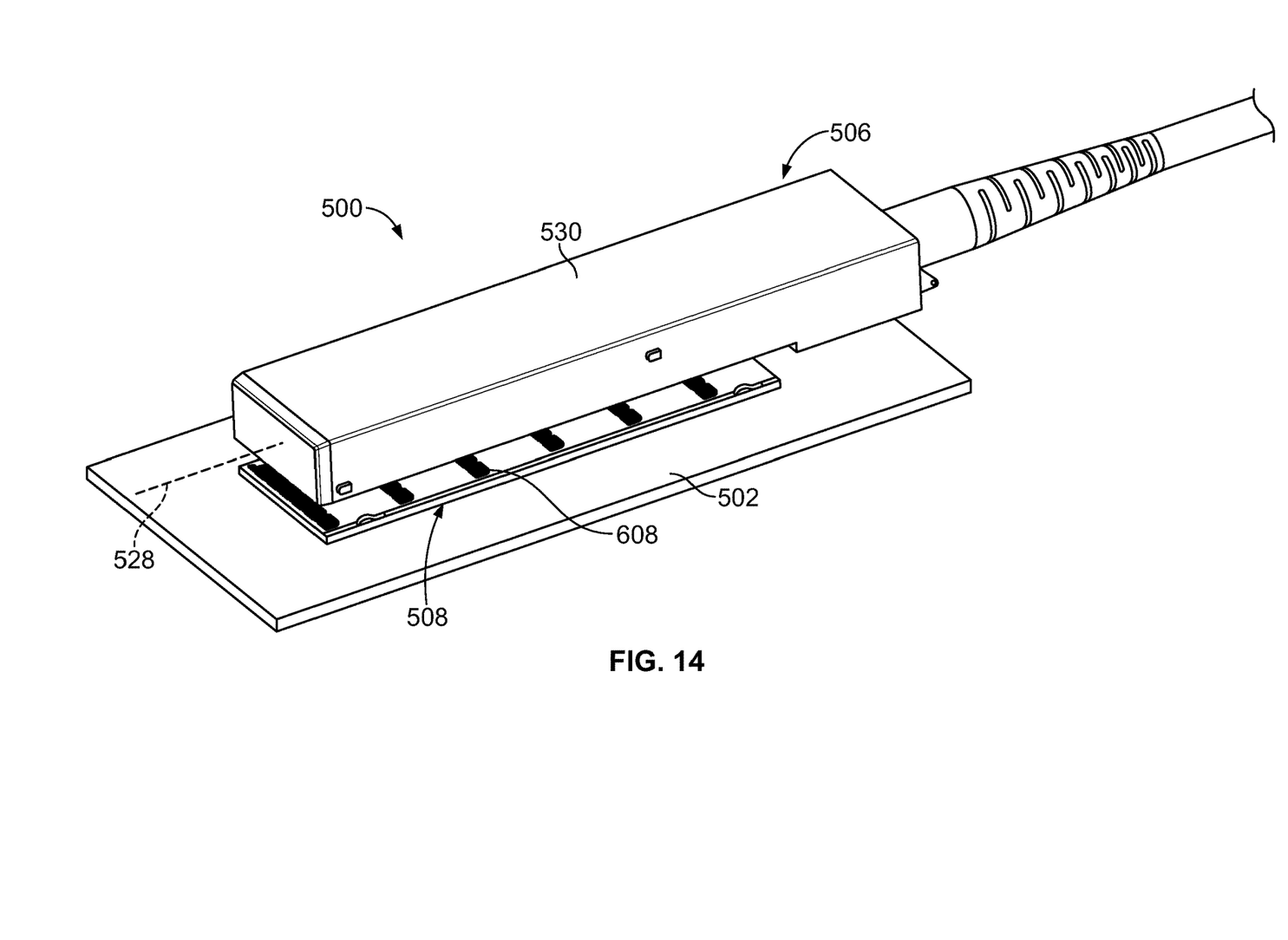
FIG. 14 is a side perspective view of a portion of the communication system showing an optical pluggable module relative to an interposer assembly in an unmated condition in accordance with an exemplary embodiment.
Figure 15:
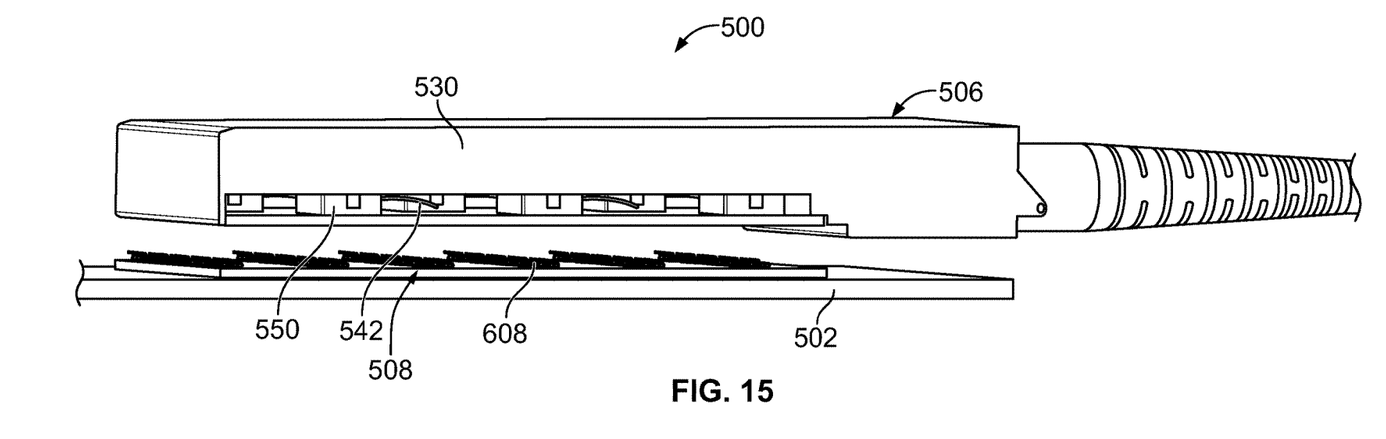
FIG. 15 is a side partial-sectional view of a portion of the communication system showing the optical pluggable module in accordance with an exemplary embodiment.
Figure 16:
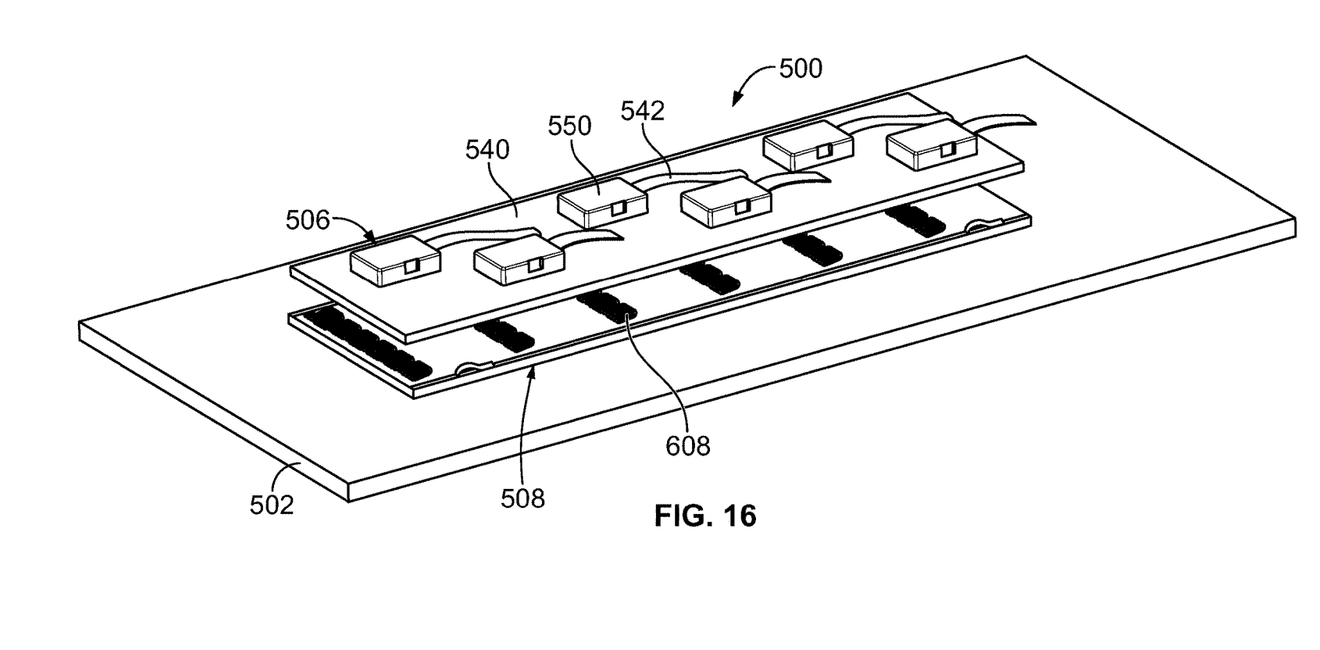
FIG. 16 is a side perspective view of a portion of the communication system showing a portion of the optical pluggable module in accordance with an exemplary embodiment.

FIG. 14 is a side perspective view of a portion of the communication system 500 showing the optical pluggable module 506 relative to the interposer assembly 508 in an unmated condition. FIG. 15 is a side, partial sectional view of a portion of the communication system 500 showing the optical pluggable module 506 relative to the interposer assembly 508 in an unmated condition. FIG. 16 is a side perspective view of a portion of the communication system 500 showing a portion of the optical pluggable module 506 relative to the interposer assembly 508 in an unmated condition.

During mating, the optical pluggable module 506 is loaded into the cage member 510 (removed for clarity to illustrate the optical pluggable module 506 relative to the interposer assembly 508) in a first mating direction along the loading axis 528, which may be generally parallel to the host circuit board 502. The optical pluggable module 506 may be mated with the interposer assembly 508 in a second mating direction, which may be generally perpendicular to the loading direction. For example, the pluggable body 530 may be pressed downward toward the interposer assembly 508 and the host circuit board 502 to directly mate the optical pluggable module 506 with the interposer assembly 508.

In an exemplary embodiment, the module contacts 608 may be arranged in multiple rows for engaging the module substrate 540. The module contacts 608 are electrically connected to the module substrate 540 when mated. The module substrate 540 may be pressed downward against the module contacts 608 to compress the module contacts 608. The optical engines 550 are provided on the module substrate 540 and the optical fiber cables 542 extend from the optical engines 550. In an exemplary embodiment, the optical engines 550 are longitudinally offset along the length of the module substrate 540. For example, the optical engines 550 may be longitudinally offset between the mating end 532 and the cable end 534. In an exemplary embodiment, the optical engines 550 are laterally offset across the width of the module substrate 540.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 114(f), unless and until such claim limitations expressly use the phrase "means for" followed by a statement of function void of further structure.

What is claimed is:

1. A communication system comprising:
 a host circuit board having a mounting area extending between a front and a rear, the host circuit board having contact pads within the mounting area;
 an interposer assembly coupled to the host circuit board at the mounting area, the interposer assembly having an interposer substrate including an upper surface and a lower surface, the interposer assembly having host circuit board contacts at the lower surface electrically connected to corresponding contact pads of the host circuit board, the interposer assembly having module contacts at the upper surface; and
 an optical pluggable module extending longitudinally between a mating end and a cable end, the optical pluggable module including a mating interface along a bottom of the optical pluggable module facing the interposer assembly, the optical pluggable module including a module substrate and optical engines coupled to the module substrate, the optical pluggable module having optical fiber cables extending from the optical engines to the cable end, the module substrate having module substrate contacts at a lower surface of the module substrate being electrically connected to corresponding module contacts of the interposer assembly at the upper surface of the interposer substrate.

2. The communication system of claim 1, wherein the optical fiber cables are bundled at the cable end in a multifiber cable bundle.

3. The communication system of claim 1, wherein the optical engines include electrical-to-optical converters coupled to the module substrate and electrically connected to the corresponding module substrate contacts.

4. The communication system of claim 1, wherein the optical engines include transmit optical engines and receive optical engines.

5. The communication system of claim 1, wherein the optical pluggable module is mated with the interposer assembly in a mating direction parallel to the bottom of the optical pluggable module.

6. The communication system of claim 1, wherein the interposer assembly is coupled to the host circuit board and the optical pluggable module is matable to and unmatable from the interposer assembly.

7. The communication system of claim 1, wherein the module contacts include deflectable spring beams having separable mating interfaces.

8. The communication system of claim 1, wherein the optical engines includes a first optical engine and a second optical engine, the second optical engine being longitudinally offset from the first optical engine such that the second optical engine is positioned closer to the cable end than the first optical engine.

9. The communication system of claim 8, wherein the second optical engine is laterally offset from the first optical engine on the module substrate.

10. The communication system of claim 1, wherein the optical pluggable module includes a guide feature configured to guide mating of the optical pluggable module with a cage member of a receptacle assembly.

11. The communication system of claim 1, wherein the optical pluggable module is loaded into position above the mounting area of the host circuit board in a horizontal loading direction to a loaded position with the interposer assembly stacked vertically between the module substrate and the host circuit board.

12. A communication system comprising:
 a host circuit board having a mounting area and contact pads within the mounting area;
 a receptacle assembly mounted to the host circuit board at the mounting area, the receptacle assembly having a cage member including a plurality of walls defining a module cavity, the walls providing electrical shielding around the module cavity, the cage member having a port at a front of the cage member open to the module cavity;

an interposer assembly located in the module cavity and coupled to the host circuit board at the mounting area, the interposer assembly having an interposer substrate including an upper surface and a lower surface, the interposer assembly having host circuit board contacts at the lower surface electrically connected to corresponding contact pads of the host circuit board, the interposer assembly having module contacts at the upper surface; and an optical pluggable module extending longitudinally between a mating end and a cable end, the mating end of the pluggable body loaded into the module cavity of the receptacle assembly through the port, the optical pluggable module including a mating interface along a bottom of the optical pluggable module facing the interposer assembly, the optical pluggable module including a module substrate and optical engines coupled to the module substrate, the optical pluggable module having optical fiber cables extending from the optical engines to the cable end, the module substrate having module substrate contacts at a lower surface of the module substrate being electrically connected to corresponding module contacts of the interposer assembly at the upper surface of the interposer substrate.

13. The communication system of claim 12, wherein the optical engines include electrical-to-optical converters coupled to the module substrate and electrically connected to the corresponding module substrate contacts.

14. The communication system of claim 12, wherein the module contacts include deflectable spring beams having separable mating interfaces.

15. The communication system of claim 12, wherein the optical engines includes a first optical engine and a second optical engine, the second optical engine being longitudinally offset from the first optical engine such that the second optical engine is positioned closer to the cable end than the first optical engine.

16. The communication system of claim 12, wherein the cage member includes a guide track having a seating portion, the optical pluggable module having a guide feature being received in the guide track to guide mating and unmating of the optical pluggable module with the cage member, wherein the optical pluggable module, the interposer assembly and the host circuit board are electrically connected when the guide feature is in the seating portion of the guide track.

17. The communication system of claim 12, wherein the optical pluggable module is loaded into position above the mounting area of the host circuit board in a horizontal loading direction to a loaded position with the interposer assembly stacked vertically between the module substrate and the host circuit board.

18. An optical pluggable module comprising:
a pluggable body having a mating end and a cable end, the pluggable body having a mating interface along a bottom of the pluggable body, the mating end of the pluggable body configured to be loaded into a receptacle assembly such that the mating interface faces a host circuit board;
a module substrate having an upper surface and a lower surface, the lower surface having substrate contacts, the upper surface having optical interfaces; and
optical engines coupled to the module substrate at the corresponding optical interfaces, the optical engines having optical fiber cables extending therefrom to the cable end, the module substrate contacts configured to be electrically connected to an interposer assembly of the receptacle assembly;
wherein the pluggable body is mated with the interposer assembly in a mating direction parallel to the bottom of the pluggable body.

19. The optical pluggable module of claim 18, wherein the optical engines include electrical-to-optical converters coupled to the module substrate and electrically connected to the corresponding module substrate contacts.

20. The optical pluggable module of claim 18, wherein the optical engines includes a first optical engine and a second optical engine, the second optical engine being longitudinally offset from the first optical engine such that the second optical engine is positioned closer to the cable end than the first optical engine.

* * * * *